(12) United States Patent
Flynn

(10) Patent No.: US 7,360,557 B2
(45) Date of Patent: Apr. 22, 2008

(54) LOW PRESSURE DROP CHECK VALVE

(75) Inventor: William T. Flynn, Horton, MI (US)

(73) Assignee: Eaton Corporation, Cleveland, OH (US)

( * ) Notice: Subject to any disclaimer, the term of this patent is extended or adjusted under 35 U.S.C. 154(b) by 405 days.

(21) Appl. No.: 11/046,170

(22) Filed: Jan. 28, 2005

(65) Prior Publication Data

US 2005/0166970 A1    Aug. 4, 2005

Related U.S. Application Data

(60) Provisional application No. 60/540,467, filed on Jan. 30, 2004.

(51) Int. Cl.
*F16K 21/10* (2006.01)

(52) U.S. Cl. .............................. 137/514.5; 137/515.5; 137/538

(58) Field of Classification Search ............ 137/514.5, 137/515.5, 516.29, 538, 540
See application file for complete search history.

(56) References Cited

U.S. PATENT DOCUMENTS

| | | | |
|---|---|---|---|
| 1,199,616 A * | 9/1916 | Rushton | 137/538 |
| 1,841,337 A * | 1/1932 | Roessler | 137/538 |
| 2,318,962 A | 5/1943 | Parker | |
| 2,339,101 A * | 1/1944 | Parker | 137/514.5 |
| 2,772,690 A * | 12/1956 | Jean et al. | 137/514.5 |
| 2,928,417 A * | 3/1960 | Buckner et al. | 137/538 |
| 2,930,401 A * | 3/1960 | Cowan | 137/540 |
| 3,375,853 A * | 4/1968 | Meshulam | 137/538 |
| 3,489,170 A * | 1/1970 | Leman | 137/516.29 |
| 4,770,206 A * | 9/1988 | Sjoberg | 137/516.29 |
| 5,240,036 A | 8/1993 | Morris | |
| 5,921,276 A | 7/1999 | Lam et al. | |

FOREIGN PATENT DOCUMENTS

FR       1 481 723       5/1967

OTHER PUBLICATIONS

PCT/US2005/003342, International Search Report, mailed May 9, 2005 (5 pages), Applicant: Eaton Corporation.

* cited by examiner

*Primary Examiner*—John Rivell
(74) *Attorney, Agent, or Firm*—Benesch, Friedlander Coplan & Aronoff LLP

(57) ABSTRACT

A check valve includes a valve housing having a first housing portion including an inlet and a second housing portion having an outlet. A poppet valve is received in the housing and includes an outer surface having a diameter greater than the diameters of the inlet and outlet. A valve guide is also received in the valve housing and defines a variable volume pressure cavity and a fluid flow path. The valve guide is adapted to provide the variable volume pressure cavity in communication with the fluid flow path. A resiliently compressible member is adapted to bias the poppet valve toward a closed position against a flow of fluid through the check valve and a low pressure force created in the variable volume pressure cavity by virtue of the fluid flow through the valve guide.

15 Claims, 4 Drawing Sheets

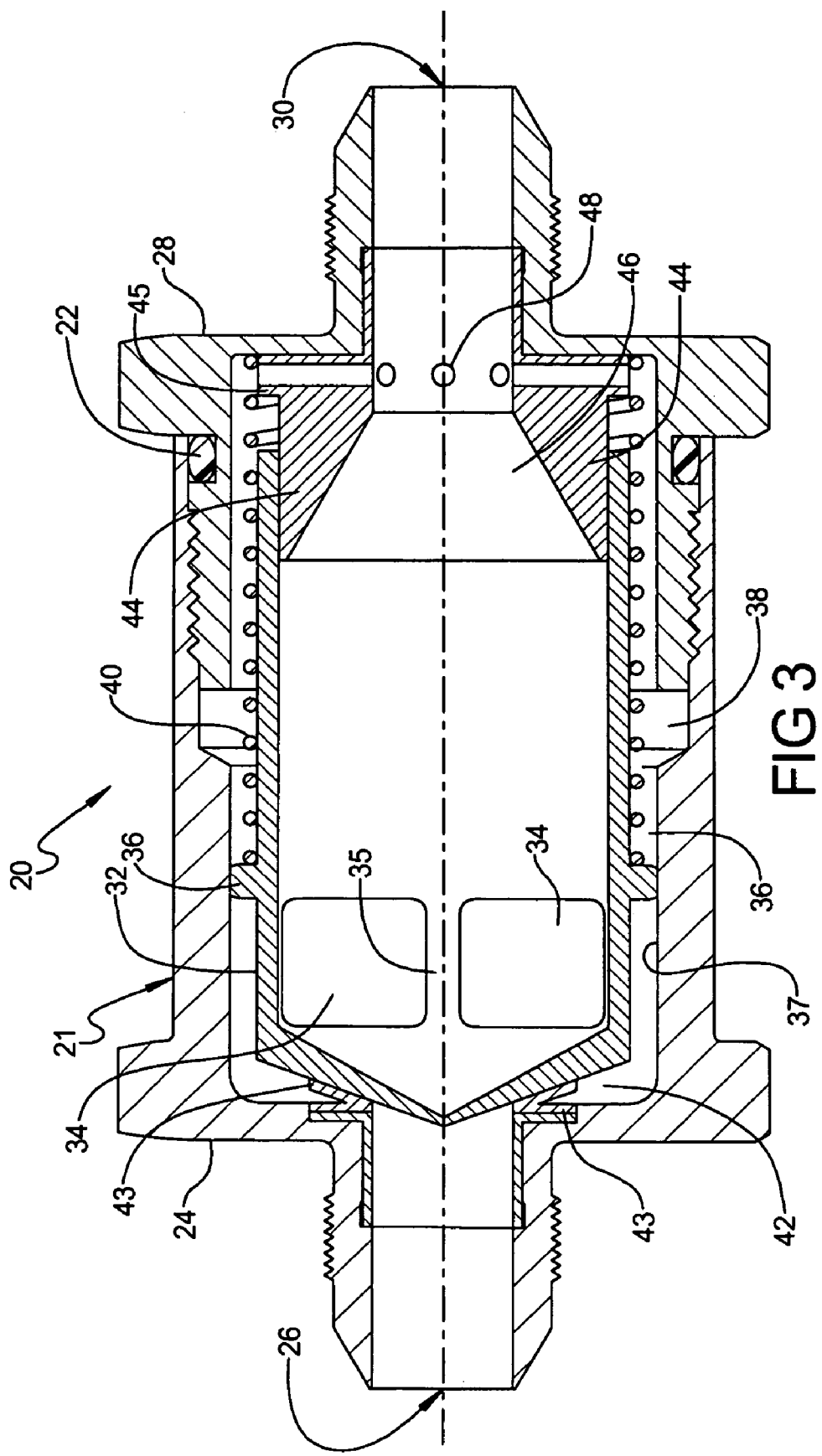

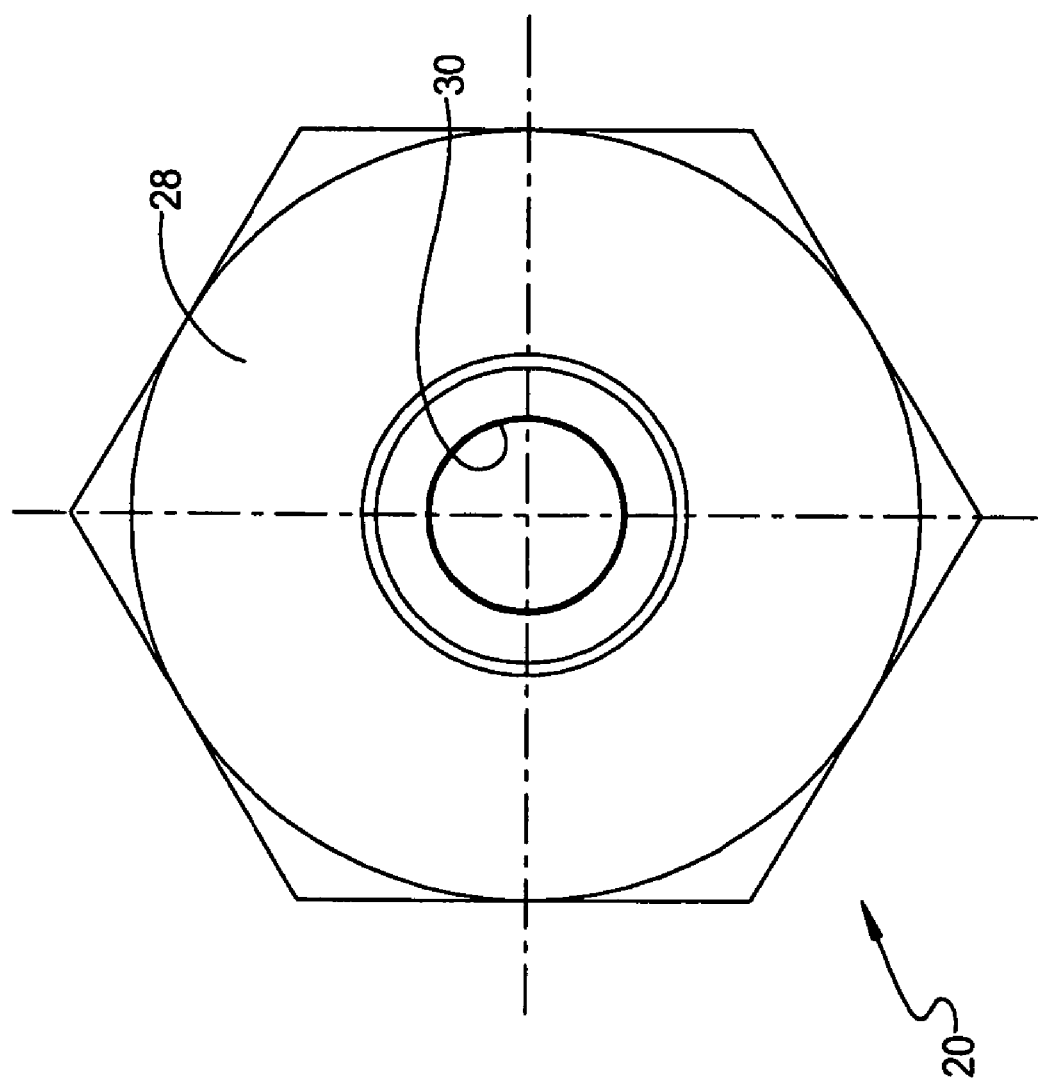

LOW PRESSURE DROP CHECK VALVE

CROSS REFERENCE TO RELATED APPLICATIONS

This application claims priority to U.S. provisional application 60/540,467, filed on Jan. 30, 2004, which is incorporated herein by reference in its entirety.

BACKGROUND OF THE INVENTION

1. Field of the Invention

The present invention relates to a check valve and, more particularly, to a low pressure drop hydraulic or pneumatic check valve.

2. Description of the Related Art

Aerospace pneumatic check valves, among other types of check valves, are typically required to meet stringent weight and space constraint requirements, while generating the lowest possible pressure drop for a particular flow rate and operating pressure. Many aerospace applications restrict the envelope size of the check valve to the space available or remaining on an aircraft after all of the major aircraft components have been positioned and installed. If, for example, a relatively small, lightweight check valve is required in a given aircraft installation, a check valve manufacturer is typically required to use a single piece housing for the body of the check valve to minimize envelop size and weight. Although satisfactory for reducing size and weight, a single piece housing undesirably restricts the size of the internal check valve components to the size of the housing's inlet and outlet ports through which these components must pass during assembly.

If, on the other hand, a low pressure drop check valve is required in a given aircraft installation, then the aircraft manufacturer typically demands the lowest pressure drop obtainable regardless of envelope size or weight. Since the pressure drop for a given flow rate is inversely proportional to the size of the cross-sectional area of the flow path, a check valve's inlet and outlet diameters often dictate the amount of pressure drop. In addition to the inlet and outlet diameters, other factors contribute to the pressure drop of a hydraulic or pneumatic check valve, including without limitation, fluid drag along the walls and surfaces of the check valve, change in direction of flow through the check valve, division of a single flow path into several flow paths and corresponding merger of several flow paths into a single flow path, acceleration and deceleration of the fluid flow stream, presence of eddy currents in the flow stream, and the energy required to hold a poppet valve open against a biasing spring force. Any check valve design that limits or reduces the effect of these factors will reduce the pressure drop for a given fluid, at a given flow rate and at a given pressure.

In light of these and other considerations, check valve designers balance the requirements for lower weight, smaller envelope size and lower pressure drop in their designs, while reducing the cost to manufacture. Since, size and weight of a check valve are generally inversely proportional to its pressure drop, prior art check valve designs typically compromise one feature for another. For these and other reasons, an improved check valve is desired that overcomes limitations of the prior art.

SUMMARY OF THE INVENTION

A check valve is provided that include a valve housing having first and second housing portions secured together. The first housing portion includes an inlet having a first diameter and the second housing portion includes an outlet having a second diameter. A poppet valve is received in the housing and includes an outer surface having a diameter greater than the first and second diameters of the inlet and outlet. The poppet valve is adapted to move within the housing between an open position and a closed position. A valve guide is also received in the valve housing. The valve guide, the poppet valve and the valve housing cooperatively define a variable volume pressure cavity and a fluid flow path. The valve guide is adapted to provide the variable volume pressure cavity in communication with the fluid flow path. A resiliently compressible member is adapted to bias the poppet valve toward the closed position against a flow of fluid through the check valve and a low pressure force created in the variable volume pressure cavity by virtue of the fluid flow through the valve guide.

Other aspects of the invention will be apparent to those skilled in the art after review of the drawings and detailed description provided below.

BRIEF DESCRIPTION OF THE DRAWINGS

Embodiments of the invention will now be described, by way of example, with reference to the accompanying drawings, wherein:

FIG. 3 is a cross-section view of the check valve of FIG. 1, showing the check valve in a closed state; and FIG. 4 is an end view of a check valve according to an embodiment of the present invention.

DETAILED DESCRIPTION OF THE INVENTION

Figure 1:
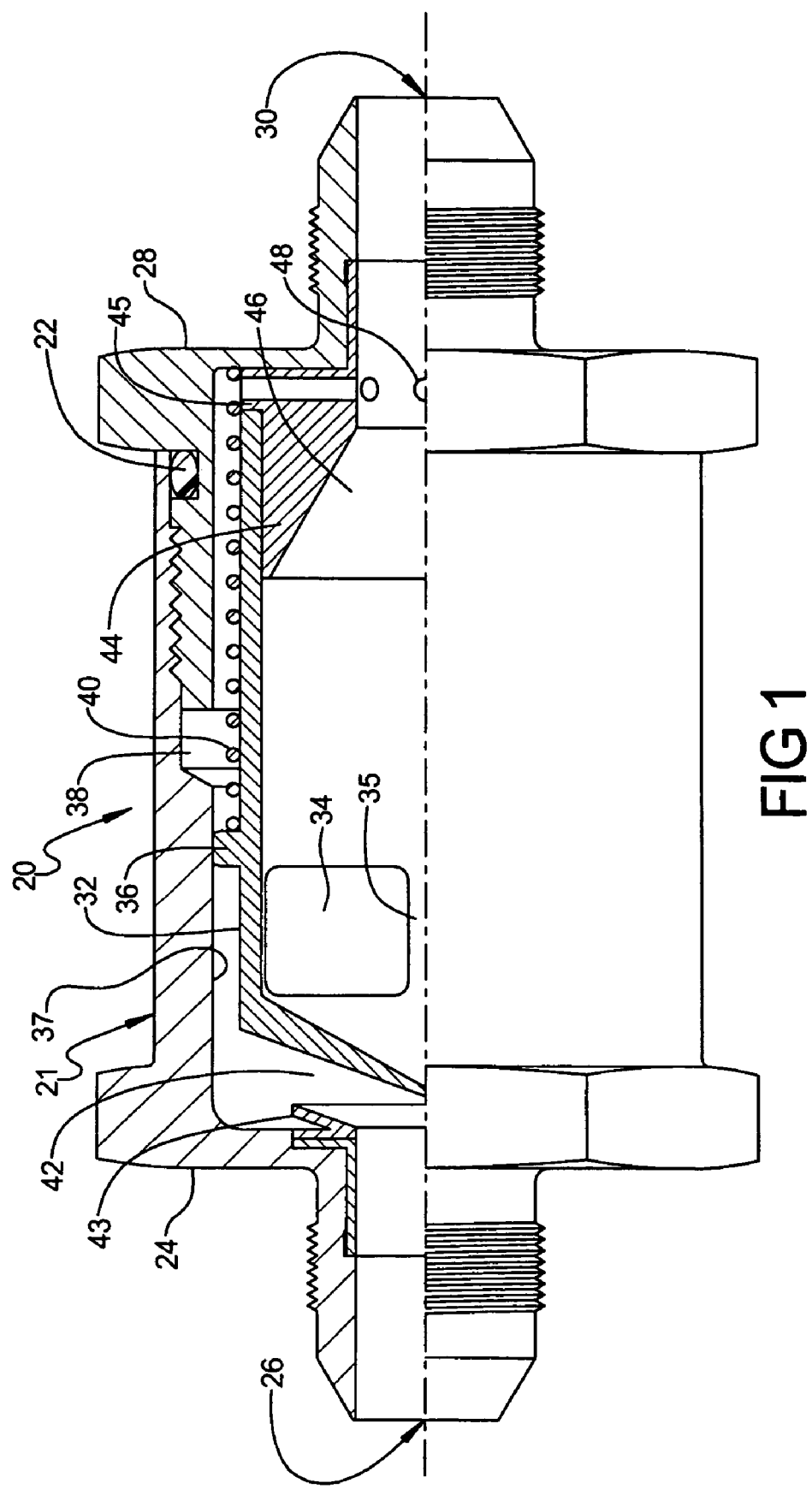
FIG. 1 is a partial cross-section view of a check valve according to an embodiment of the present invention.

Referring to FIGS. 1-4, a check valve 20 according to an embodiment of the invention is shown. In the illustrated embodiment, the check valve 20 utilizes a two-part housing 21 joined together with a pair of opposing threaded surfaces, such as standard straight threads, or other suitable means, such as welding. An annular sealing member 22, such as an O-ring, is positioned between the housing components to inhibit leakage therebetween. The two-part housing includes an inlet housing portion 24 having an inlet 26 and an outlet housing portion 28 that includes an outlet 30. The two-part housing offers the ability to use internal components much larger than the diameters of the inlet 26 and outlet 30, which results in a significantly larger internal flow path and smaller pressure drop. In an embodiment, both housing portions 24 and 28 feature aerospace standard flared end fittings, such as those conforming to the AS4395E06 standard, but are not necessarily limited thereto. The end fitting of the inlet housing portion 24 has an internal diameter that is utilized as the check valve's orifice (i.e., smallest flow path through the check valve). As will be appreciated, utilizing the internal diameter of the inlet 26 as the check valve's orifice reduces manufacturing and machining costs.

A tubular-style poppet valve 32 is received in the two-part housing 21 and features generally rectangular ports 34 in lieu of circular hole ports, which are typically found in prior art check valves. The rectangular ports 34 feature relatively small support webs 35 that reduce the pressure drop through the poppet valve 32, particularly when compared to the prior art circular ports with larger support webs. The poppet valve 32 also includes an external radial rib 36 located proximate the base of the rectangular ports 34. The rib 36 functions as an axial travel guide by slidingly contacting an inside wall 37 of the housing 24, provides a support shoulder for a resilient biasing member (discussed below), and defines the size of the fluid flow path entering the poppet valve ports. As will be describe in further detail below, the rib 36 also defines the sliding end of a variable volume pressure cavity 38.

A resiliently compressible biasing member 40, such as a compression spring, is enclosed within the variable volume pressure cavity 38 and provides a biasing force against the rib 36 on the poppet valve 32. In an embodiment of the invention, the biasing member 40 is located completely outside the fluid flow path, which reduces the pressure drop since there is no fluid drag across the biasing member 40 and virtually eliminates any frictional wear on the biasing member 40.

Figure 2:
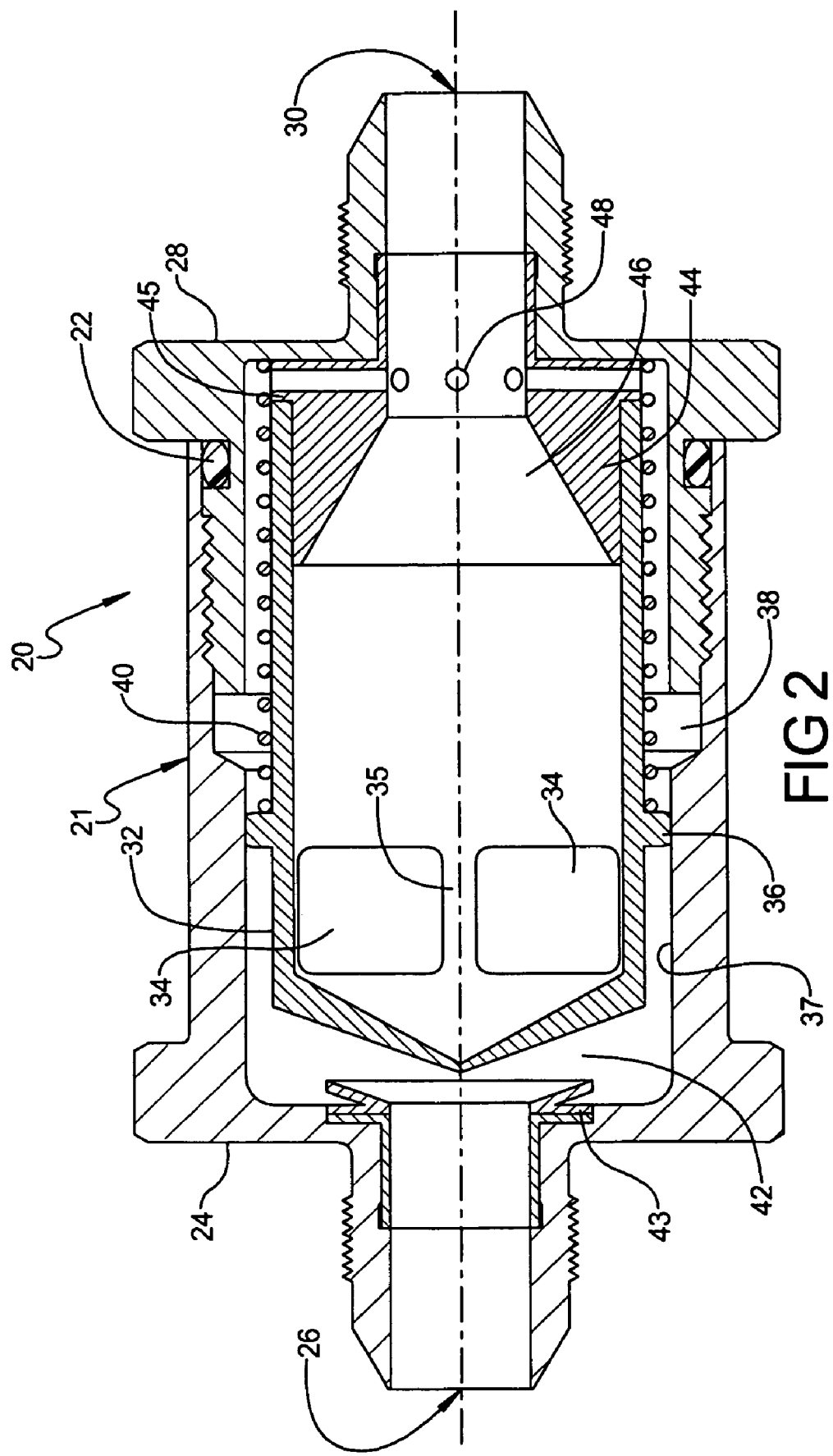
FIG. 2 is a cross-section view of the check valve of FIG. 1, showing the check valve in an open state.

In an embodiment, the inlet housing 24 cooperates with the poppet valve 32 (when partially or fully opened as shown in FIG. 2) to form a fluid diffuser cavity 42. The flow path is optimized by the fluid diffuser cavity 42, which reduces the fluid velocity entering the poppet valve 32 and reduces the pressure drop generated by the change in direction required for the fluid to flow into the ports 34 and through the poppet valve 32. An optional polymeric valve seat 43 may be positioned between the inlet housing 24 and the poppet valve 32. As shown in FIG. 2, the concentric, truncated cone-shaped surfaces of the valve seat 43 and poppet valve 32 form a flow path in front of the poppet valve 32 that functions as a fluid diffuser.

In an embodiment, the outlet housing 28 also includes a multi-function valve guide 44. The valve guide 44 guides the poppet valve 32 substantially through its entire travel, stops and positions the poppet valve 32 at the full open position, houses a convergent nozzle 46, includes a series of venturi ports 48 and defines a fixed portion of the variable volume pressure cavity 38. The valve guide 44 cooperates with the poppet valve rib 36 to maintain the linear axial travel of the poppet valve 32 through its entire stroke. The guide 44 maintains proper alignment of the poppet valve 32 with the inlet housing 24 or optional valve seat 43, which ensures leak free reverse flow performance. The valve guide 44 also includes a shoulder 45 that is used to accurately stop and position the poppet valve 32 at its fully open position.

In an embodiment, the convergent nozzle 46 forces the fluid flowing through the poppet valve 32 to accelerate as it passes over the venturi ports 48. This accelerated flow through the nozzle 46 generates a relatively low pressure within the venturi ports 48. Since the venturi ports 48 directly connect the fluid outlet port 30 to the variable volume pressure cavity 38, the low pressure created within the venturi ports 48 is transmitted to and lowers the pressure within the variable volume pressure cavity 38. The relatively low pressure created within the variable volume pressure cavity 38 acts upon the inside face (right-side face in FIGS. 2 and 3) of the radial external rib 36 of the poppet valve 32, while the operating fluid pressure acts upon the outside face of the poppet valve rib 36. The two differential pressures acting on opposite sides of the rib 36 generate a venturi-created axial force (to the right in FIGS. 2 and 3) acting on the poppet valve 32. The venturi created axial force substantially cancels the biasing spring force, which is attempting to close the poppet valve 32 against the force of in-coming fluid flow.

The energy lost within the fluid used to hold the poppet valve 32 open against the biasing force generated by the resilient biasing member 40 can be measured in pressure drop. For example, the check valve 20 of the present invention was tested against a check valve substantially similar to the check valve 20 of the present invention, but having a valve guide without venturi ports 48. In the test, check valve 20 with the venturi ports 48 exhibited a 267% decrease in pressure drop compared to the check valve without the venturi ports.

In a particular application, the check valve 20 of the present invention may be employed within a nitrogen purge plumbing system of an aircraft fuel tank(s). In this application, the check valve 20 may be mounted vertically in the aircraft with the outlet 30 facing down. In addition to the features described above, the venturi ports 48 also perform a secondary function of draining any fuel that enters the check valve 20 through the outlet port 30, such as in the case of over-filling and/or fuel sloshing within the tank and entering the check valve 20. Without venturi ports 48, this fuel would be captured in the cavity 38 formed between the valve guide 32 and outlet housing 28.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A check valve, comprising:
    a valve housing that includes first and second housing portions, the first housing portion including an inlet and the second housing portion including an outlet, wherein the first and second housing portions include flared end fittings and the end fitting of the first housing portion has an internal diameter that is the check valve's orifice;
    a poppet valve received in the housing and adapted to move within the housing between an open position and a closed position;
    a valve guide received in the valve housing, the valve guide, the poppet valve and the valve housing cooperatively defining a variable volume pressure cavity and a fluid flow path, the valve guide adapted to provide the variable volume pressure cavity in communication with the fluid flow path; and
    a resiliently compressible member adapted to bias the poppet valve toward a closed position against a flow of fluid through the check valve and a low pressure force created in the variable volume pressure cavity by virtue of the fluid flow through the valve guide.

2. A check valve, comprising:
a valve housing that includes first and second housing portions, the first housing portion including an inlet and the second housing portion including an outlet;
a poppet valve received in the housing and adapted to move within the housing between an open position and a closed position;
a valve guide including a convergent nozzle and at least one venturi port, the valve guide being received in the valve housing, the valve guide, the poppet valve and the valve housing cooperatively defining a variable volume pressure cavity and a fluid flow path, the valve guide adapted to provide the variable volume pressure cavity in communication with the fluid flow path; and
a resiliently compressible member adapted to bias the poppet valve toward a closed position against a flow of fluid through the check valve and a low pressure force created in the variable volume pressure cavity by virtue of the fluid flow through the valve guide.

3. The check valve of claim 2, wherein an annular sealing member is positioned between the first and second housing portions to inhibit leakage therebetween.

4. The check valve of claim 2, wherein the poppet valve includes at least one generally rectangular port adapted to reduce the pressure drop through the poppet valve.

5. The check valve of claim 2, wherein the poppet valve includes an external radial rib that slidingly contacts an inside wall of the valve housing and is adapted to provide a support shoulder for the resilient biasing member.

6. The check valve of claim 5, wherein the rib defines a sliding end of the variable volume pressure cavity.

7. The check valve of claim 2, wherein the biasing member is located outside the fluid flow path.

8. The check valve of claim 2, wherein the first housing portion and the poppet valve cooperatively define a fluid diffuser cavity.

9. The check valve of claim 2, wherein the first housing portion includes a polymeric valve seat positioned between the first housing portion and the poppet valve.

10. The check valve of claim 9, wherein the valve seat and poppet valve include truncated cone-shaped surfaces that form a flow path in front of the poppet valve that functions as a fluid diffuser.

11. The check valve of claim 2, wherein a poppet valve includes an outer surface having a diameter greater than a diameter of the inlet and outlet.

12. The check valve of claim 2, wherein the convergent nozzle is adapted to accelerate the fluid flow as it passes over the venturi port.

13. The check valve of claim 2, wherein the venturi port connects the outlet to the variable volume pressure cavity.

14. The check valve of claim 2, wherein the pressure within the venturi port is substantially similar to the pressure within the variable volume pressure cavity.

15. The check valve of claim 2, wherein the valve guide defines a fixed portion of the variable volume pressure cavity.

* * * * *